（12）United States Patent
Herrmann et al.

(10) Patent No.: US 7,779,112 B2
(45) Date of Patent: *Aug. 17, 2010

(54) METHOD AND DEVICE FOR DEPLOYING A DISTRIBUTED MONITORING

(75) Inventors: Marc Herrmann, Saint Etienne de Crossey (FR); Xiaobo Li, Puteaux (FR)

(73) Assignee: Bull S.A., Les Clayes Sous Bois (FR)

( * ) Notice: Subject to any disclaimer, the term of this patent is extended or adjusted under 35 U.S.C. 154(b) by 781 days.

This patent is subject to a terminal disclaimer.

(21) Appl. No.: 09/735,919

(22) Filed: Apr. 9, 2001

(65) Prior Publication Data

US 2002/0026506 A1    Feb. 28, 2002

(30) Foreign Application Priority Data

Dec. 16, 1999    (FR) .................................. 99 15892

(51) Int. Cl.
 *G06F 15/173* (2006.01)
(52) U.S. Cl. ........................ 709/224; 709/223
(58) Field of Classification Search ................ 709/202, 709/220, 221, 201, 203, 227, 222–225; 345/749
See application file for complete search history.

(56) References Cited

U.S. PATENT DOCUMENTS

| | | | |
|---|---|---|---|
| 5,204,955 A | | 4/1993 | Kagei et al. |
| 5,651,006 A | * | 7/1997 | Fujino et al. ................ 370/408 |
| 5,774,669 A | | 6/1998 | George et al. |
| 5,838,918 A | * | 11/1998 | Prager et al. ................ 709/221 |
| 5,845,090 A | | 12/1998 | Collins |
| 5,913,037 A | * | 6/1999 | Spofford et al. ............. 709/226 |
| 6,012,152 A | * | 1/2000 | Douik et al. ................. 714/26 |
| 6,055,493 A | * | 4/2000 | Ries et al. .................... 702/186 |
| 6,055,562 A | * | 4/2000 | Devarakonda et al. ....... 709/202 |
| 6,122,664 A | * | 9/2000 | Boukobza et al. ............ 709/224 |
| 6,134,581 A | * | 10/2000 | Ismael et al. ................. 709/202 |

(Continued)

FOREIGN PATENT DOCUMENTS

EP    0951155 A1    10/1999

(Continued)

OTHER PUBLICATIONS

Marques, P.J.; Silva, L.M.; Silva, J.G.; "Establishing a secure open-environment for using mobile agents in electronic commerce" Agent Systems and Applications, 1999 and Third International Symposium on Mobile Agents. IEEE, pp. 268-269.*

(Continued)

*Primary Examiner*—William C. Vaughn, Jr.
*Assistant Examiner*—Greg Bengzon
(74) *Attorney, Agent, or Firm*—Miles & Stockbridge P.C.; Eric G. King (57) ABSTRACT

A method and device for deploying a distributed monitoring of a computer system having a plurality of resources forming at least one monitored domain. The method includes specifying for each indicator to be deployed, the domain or domains of the computer system in which each indicator should be deployed and deploying the specified configuration using a configuration deployment agent that creates, for each resource to be monitored, a configuration agent to handle the creation of the indicators.

20 Claims, 2 Drawing Sheets

U.S. PATENT DOCUMENTS

| | | | | |
|---|---|---|---|---|
| 6,137,782 | A * | 10/2000 | Sharon et al. | 370/255 |
| 6,145,001 | A * | 11/2000 | Scholl et al. | 709/223 |
| 6,253,243 | B1 * | 6/2001 | Spencer | 709/224 |
| 6,308,208 | B1 * | 10/2001 | Jung et al. | 709/224 |
| 6,370,572 | B1 * | 4/2002 | Lindskog et al. | 709/223 |
| 6,393,472 | B1 * | 5/2002 | Anerousis et al. | 709/223 |
| 6,404,743 | B1 * | 6/2002 | Meandzija | 370/254 |
| 6,418,445 | B1 * | 7/2002 | Moerbeek | 707/103 X |
| 6,430,613 | B1 * | 8/2002 | Brunet et al. | 709/223 |
| 6,430,712 | B2 * | 8/2002 | Lewis | 714/47 |
| 6,460,070 | B1 * | 10/2002 | Turek et al. | 709/202 |
| 6,477,667 | B1 * | 11/2002 | Levi et al. | 714/57 |
| 6,516,189 | B1 * | 2/2003 | Frangione et al. | 455/405 |
| 6,519,635 | B1 * | 2/2003 | Champlin et al. | 709/223 |
| 6,571,286 | B2 | 5/2003 | Fisher et al. | |
| 6,574,655 | B1 * | 6/2003 | Libert et al. | 709/200 |
| 6,671,724 | B1 * | 12/2003 | Pandya et al. | 709/226 |
| 6,681,243 | B1 * | 1/2004 | Putzolu et al. | 709/202 |
| 6,714,976 | B1 * | 3/2004 | Wilson et al. | 709/224 |
| 7,054,932 | B2 * | 5/2006 | Herrmann et al. | 709/226 |
| 7,058,704 | B1 * | 6/2006 | Mangipudi et al. | 709/223 |
| 7,284,048 | B2 * | 10/2007 | Jakobson et al. | 709/224 |
| 7,600,007 | B1 * | 10/2009 | Lewis | 709/223 |

FOREIGN PATENT DOCUMENTS

WO    98/33122    7/1998

OTHER PUBLICATIONS

Parnes, P.; Synnes, K.; Schefstrom, D.; "A framework for management and control of distributed applications using agents and IP-multicast" INFOCOM '99. Eighteenth Annual Joint Conference of the IEEE Computer. IEEE, vol. 3, Mar. 21-25, 1999.*

Stallings, Willam; "SNMP, SNMPv2, SNMPv3 and RMON 1 and 2", Third Edition, ISBN 0201485346, Copyright 1999, revised from 1996; pp. 6-14, 23-30, 55-59, 204-205, 209-239.*

Z. Liang et al., "Cluster Probe: An Open, Flexible and Scalable Cluster Monitoring Tool", Dec. 2, 1999, pp. 261-268.

J. Yang et al., "A Scalable, Web-based Architecture for Hierarchical Network Management", Dec. 5, 1999, pp. 1882-1888.

* cited by examiner

METHOD AND DEVICE FOR DEPLOYING A DISTRIBUTED MONITORING

CROSS-REFERENCE TO RELATED APPLICATIONS

The subject matter of this invention is related to application Ser. No. 09/736,304 filed Dec. 15, 2000, now U.S. Pat. No. 7,054,932 which issued on May 30, 2006, and corresponding to French Application 99/15894 (BULL 3866-T2153-906758), both in the names of Marc Herrmann and Xiaobo Li and entitled, "Scalable Monitoring Method and Device." The subject matter of the above-listed patents is hereby incorporated by reference.

FIELD OF THE INVENTION

The present invention relates to a method and a device for deploying a distributed monitoring of a computer system.

DESCRIPTION OF RELATED ART

A computer system may include a set of computer equipment units called distributed resources, each of the units being interconnected to the others through a communication network.

Large companies have an increasing number of units of computer equipment to manage. These units, connected to one another through a communication network called a local area network (LAN), are managed by a manager. In order to manage (supervise, act on, monitor, control) these units remotely from one point, an architectural model comprising a manager and an agent, for example of the SNMP type, is most commonly adopted. In this architectural model, the (SNMP) agents implemented in the equipment units of the network inform the manager of the status of each of the units managed. In the vast majority of cases, this manager manages several hundred thousand units of distributed equipment in one or several countries.

In order to characterize the behavior of a set of resources interconnected through a network, monitoring methods synthesize, and therefore calculate values known as indicators, which make it possible to characterize the operation and the status of these resources. The calculation of an indicator is performed by an agent called an "indicator agent," which periodically calculates a value resulting from a function that combines values measured by means of an SNMP or CMIP protocol layer with values calculated by other indicator agents.

The difficulty in setting up equipment monitoring according to the prior art lies in the increase in the number of units of equipment, which requires the management to be distributed, and consequently makes it necessary to automate the deployment of this distributed monitoring.

SUMMARY OF THE INVENTION

The object of the present invention is to eliminate the drawbacks of the prior art by offering a method for deploying distributed monitoring that makes it possible to automate and parallelize the deployment of a monitoring.

This object is achieved by the method according to the invention, characterized by a configuration step that specifies, for each indicator to be deployed, the domain or domains of the computer system in which each indicator should be deployed, an indicator characterizing the status or the operation of one or more resources of the computer system, and a step for deploying the specified configuration, implemented by an agent called a configuration deployment agent that creates, for each resource to be monitored, an agent called a configuration agent, this configuration agent handling the creation of the indicator agents for the resource that has been assigned to it by the configuration deployment agent.

In another embodiment, each configuration agent creates an agent called an indicator deployment agent for each indicator of the resource to which it is assigned, and this indicator deployment agent determines, for the indicator with which it is associated, the various combinations of the values of the variables for which the indicator is calculated.

In another embodiment, for any indicator, an indicator compiler; after analyzing the formula defining the indicator, generates two object classes "I_Deployer" and I_"Indicator," which respectively correspond to the indicator deployment agents that deploy the instances of the class "I_Indicator" and to the indicator agents that evaluate the indicator.

In another embodiment, the indicator deployment agent executes a process for resolving the names of the objects referenced in the formula of the indicator and creates the corresponding indicator agents by determining the valid combinations of the values of the variables of these objects.

In another embodiment, the name resolution process consists of applying a process for searching for all of the objects identified in the formula of the indicator, the search process consisting of:
  verifying for a referenced object whether a constraint expressed in the values of the variables is satisfied,
  if the constraint is satisfied, creating the indicator agent associated with the indicator deployment agent, using as parameters the objects corresponding to the valid combinations of the values of the variables found.

In another embodiment, the configuration deployment agents and the configuration agents are managed by at least one agent machine installed in at least one resource of the monitored domain.

In another embodiment, each indicator deployment agent is managed either by the agent machine that manages the configuration agent associated with the indicator deployment agent, or by a different agent machine.

A second object of the invention is to eliminate the drawbacks of the prior art by offering a device for deploying a distributed monitoring that makes it possible to automate and parallelize the deployment of a monitoring.

This object is achieved by the device for the deployment of a distributed monitoring, characterized in that it comprises a plurality of resources to be monitored, characterized in that it comprises configuration means that specify, for each indicator to be deployed, the domain or domains of the computer system in which each indicator should be deployed, an indicator characterizing the status or the operation of one or more resources of the computer system, the configuration means also comprising an agent called a configuration deployment agent that creates, for each resource to be monitored, an agent called a configuration agent, this configuration is agent handling the creation of indicator agents for the resource that has been assigned to it by the configuration deployment agent.

In another embodiment, each configuration agent comprises means for creating an agent called an indicator deployment agent for each indicator of the resource to which it is assigned, this indicator deployment agent determining, for the indicator with which it is associated, the various combinations of the values of the variables for which the indicator is calculated.

In another embodiment, the device comprises an indicator compiler that generates for each indicator, after analyzing the formula defining the indicator, two object classes "I_Deployer" and "I_Indicator," which respectively correspond to the indicator deployment agents that deploy the instances of the class "Indicator" and to the indicator agents that evaluate the indicator.

In another embodiment, the indicator deployment agent comprises means for resolving the names of the objects referenced in the formula of the indicator and means for creating the corresponding indicator agents by determining the valid combinations of the values of the variables of these objects determined by the name resolution means.

In another embodiment, the name resolution means comprise means for searching for all of the objects identified in the formula of the indicator, the search means comprising means for verifying, for a referenced object, whether the constraint expressed in the values of the variables is satisfied, and means for creating the indicator agent associated with the indicator deployment agent if the constraint is satisfied, using as parameters the objects corresponding to the valid combinations of the values of the variables found.

In another embodiment, the configuration deployment agents and the configuration agents are managed by at least one agent machine installed in at least one resource of the monitored domain.

In another embodiment, each indicator deployment agent is managed either by the agent machine that manages the configuration agent associated with the indicator deployment agent, or by a different agent machine.

BRIEF DESCRIPTION OF THE DRAWINGS

The invention, along with its characteristics and advantages, will emerge more clearly through the reading of the description given in reference to the attached drawings, in which.

DESCRIPTION OF THE PREFERRED EMBODIMENTS

Setting up a monitoring of a computer system requires the configuration, then the deployment of this monitoring. A configuration of a monitoring is defined by a set of domains and indicators. A domain symbolically contains a set of equipment units of the computer system to be monitored. An indicator designates both the value characterizing the status or the operation of a set of equipment to be monitored, and the equation that makes it possible to calculate this value.

Configuring a monitoring consists of specifying for each indicator the domain or domains for which the indicator could be deployed. Deploying an indicator for a given domain consists of instantiating the indicator for each unit of equipment belonging to this domain. The method and the device according to the invention make it possible to perform this deployment.

Figure 1:
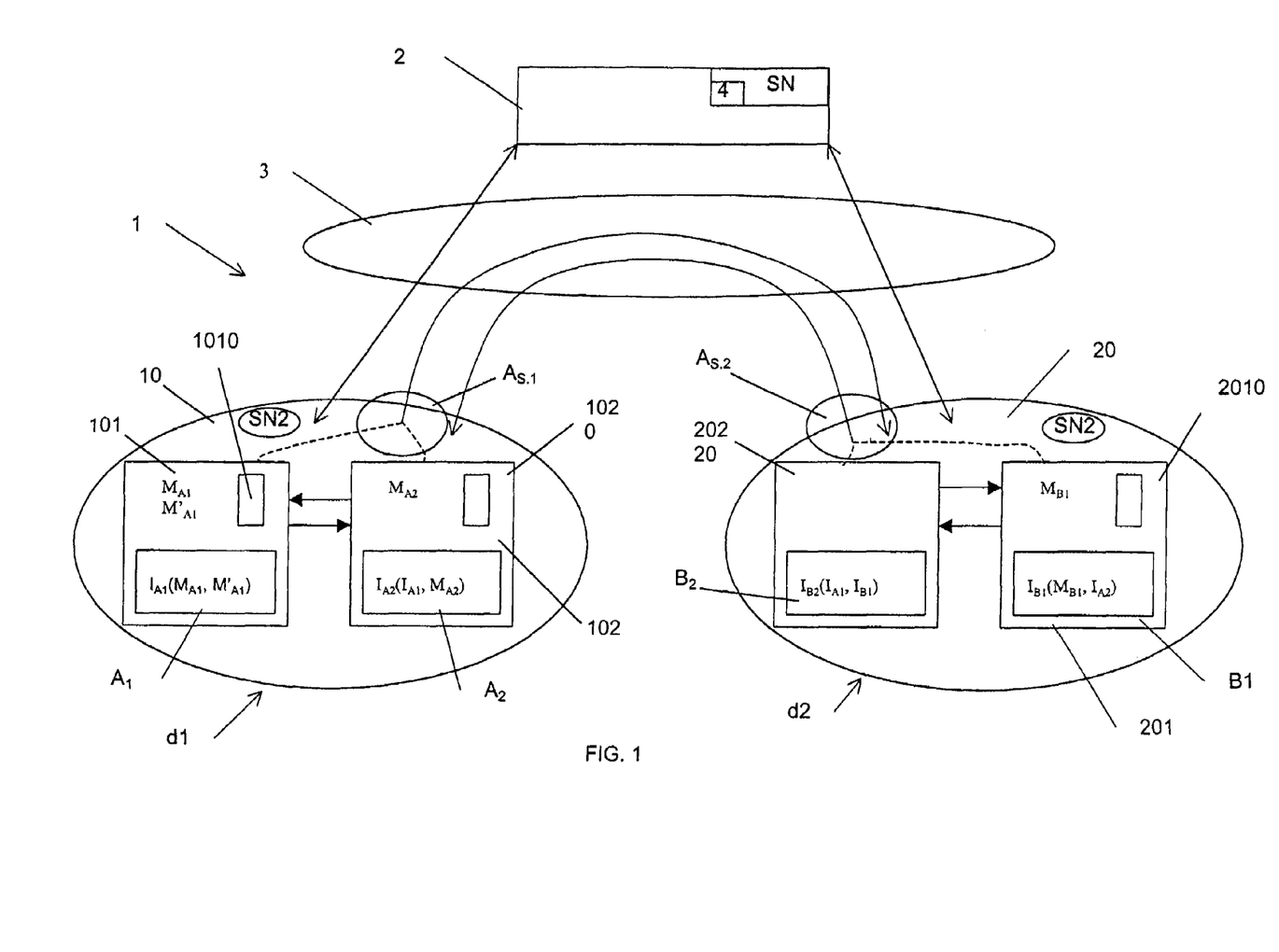
FIG. 1 represents a simplified schema of a computer system in which the method of the invention can be applied.

The invention will now be described in reference to FIGS. 1 and 2.

As explained above, a computer system (1) comprises at least one local area network (10, 20) that communicates with a central system (2) or manager through a wide area network (3). Each local area network (10, 20) comprises at least one unit of computer equipment (101, 102, 201, 202) called a resource.

In the prior art, the monitoring of all the resources (101, 102, 201, 202) is handled by means of remote agents (SNMP or CMIP agents, depending on the management protocol in question) installed in each resource (101, 102, 201, 202). These agents allow a manager to collect information on the resources (101, 102, 201, 202) by measuring given parameters, for example by sending an SNMP request GetRequest to the SNMP agent in question, then to transmit the collected information to the manager (2) by means of a request, for example GetResponse in the SNMP world. The manager (2) then evaluates the indicators from this received information. It is understood that all the requests sent by the manager (2) in order to gather monitoring information and the responses to these requests from the agents produces considerable congestion in the wide area network (3), consequently diminishing its performance.

According to the invention, all or part of the evaluation of the indicators is distributed at the local area network level (10, 20) to indicator agents.

To do this, for each indicator (In) characterizing a particular operation or status of a resource (101, 102, 201, 202), a specific indicator agent (A1, A2, B1, B2) is installed in the resource (101, 102, 201, 202). In the exemplary embodiment represented in FIG. 1, each indicator agent (A1, A2, B1, B2) is responsible for evaluating a different indicator (In). In other words, each indicator (In) makes it possible to determine a different operation or a different status in each resource (101, 102, 201, 202). However, each indicator agent (A1, A2, B1, B2) described in reference to FIG. 1 can be present, for example, in all of the resources (101, 102, 201, 202) or all the resources of the same type in the computer system (1).

For example, a first agent (A1) can evaluate an indicator (IA1) whose formula makes it possible to know, for example, the number of alarms per minute emitted by a first resource (101). It is understood that this agent (A1) can be installed in all the resources (101, 102, 201, 202) of a computer system (1).

The indicator agents (A1, A2, B1, B2) are elementary programming and execution entities. The indicator agents (A1, A2, B1, B2) are autonomous in order to give the structure the property of scalability by making it easy to add or delete one or several indicator agents in the architecture. They are made autonomous by correctly defining the interface for these agents. They are also autonomous in terms of communication. They communicate using notifications and not procedure calls, which makes it possible to open up the architecture. This communication is asynchronous, thereby making it possible to obtain a better parallelization of the indicator agents and hence a better scalability of the architecture.

The indicator agents (A1, A2, B1, B2) can be persistent objects, and their status is derived from data that, in this case, can exist outside any execution structure and can be stored in persistent EPROM or hard disk memories. An indicator agent (A1, A2, B1, B2) is an independent machine that reacts to notifications.

Each indicator agent (A1, A2, B1, B2) is an object of a class and is identified by a respective identifier id(A1), id(A2), id(B1), id(B2) that is unique in the computer system (1) in order for communications between indicator agents to be possible, and that makes it possible to locate them. A creation agent can be created in a remote server. The creation agent is responsible for creating the identifier. The structure of the identifier must take into account the static location of the indicator agents in order to allow the system to forward the notifications, and to allow local "production" of the identifiers for the remote indicator agents. The identifier of an indicator agent comprises the following three parts:

the identification (idsac) of the agent server hosting the creation agent, the identification (idsal) of the agent server hosting the agent created, and a postmark (el), local to the agent server hosting the creation agent.

A "factory" agent is present in all of the agent servers and is responsible for creating objects in the server, making it possible to manage the creation of indicator remote agents.

According to the invention, each indicator agent (A1, A2, B1, B2) is responsible for evaluating one indicator (In). In order to do this, each indicator agent must comprise properties that make it possible to collect a measurement (Mn) on the resource (101, 102, 201, 202) with which it is associated, and communication properties that make it possible to request or receive, as necessary, at least one other indicator evaluated by another indicator agent (A1, A2, B1, B2) according to the invention, for example by means of notifications. These properties are obtained by means of specific program modules constituting each indicator agent (A1, A2, B1, B2). Thus, an indicator agent (A1, A2, B1, B2) comprises a collection module and/or a communication module. Likewise, an indicator agent (A1, A2, B1, B2) also comprises an evaluation module for calculating the indicator itself from the formula, using the information collected by the other two modules. In this evaluation module, the equation that defines the value of an indicator (IA1 for example) can refer to a possibly empty set of other indicators (IA2, IB1, for example).

The indicator agents use, for example, a communication protocol that is preferably asynchronous, which means that when an indicator agent sends a request for collecting a measurement on a resource of the system or a notification to another indicator agent, it does not wait for the response to this request or notification before possibly sending a new request or notification. In other words, the sending of requests and notifications is performed in parallel. Likewise, the management protocol can be asynchronous. For example, the asynchronous management protocol used is the protocol SNMP or the protocol CMIP.

However, it is possible to use a synchronous protocol, but the performance in that case is inferior, particularly in terms of speed in evaluating the indicators. Moreover, it is appropriate to install an asynchronous device for collecting and storing measurements so that the indicator agent that sent the request need only consult the memory of this measurement collecting device. This device is, for example, a particular management information base (MIB), called an Rmon MIB by one skilled in the art.

Each indicator agent manages a so-called subscriber list on which the names of other indicator agents according to the invention may be written. This list is stored in the storage means of the computer equipment unit associated with the indicator agent, for example in the form of a table (1010, 2010). An indicator agent A1 is written on this list by sending a specific so-called subscription notification "Subscribe (id (A1) Management Information (A1))" to another indicator agent B1, which calculates the indicator (IB1). This notification includes as parameters, a piece of management information that allows the sending agent to create an association between a propagation of a value modification and the other indicator agent (B1), and the identifier id(A1). Upon receiving a subscription notification, the destination agent (B1) processes the notification by writing into the subscriber table (2010) the identifier (IdA1) of the sending agent as well as the management information (Management Information (A1)) on the list. This list is consulted by the indicator agent (B1) that manages it, after the evaluation of the indicator (IB1) by the agent (B1). If the new value of the indicator is different from the value previously evaluated and stored by the agent, then the agent sends each indicator agent written on the subscriber list (2010) and identified by the parameter (id(A1)) a value change notification (ValueChanged) comprising the new value (Val(IB1)) of the indicator (IB1). To do this, after the evaluation of the indicator (IB1), a comparison module of the indicator agent (B1) compares the new value of the indicator (Val(IB1)) to the value previously calculated (Valp (IB1)) and stored. If the two values are different, the comparison module activates a procedure for sending the value change notification (ValueChanged) to all of the agents, for example A, written on the subscriber list (2010) then records the new value of the indicator in the storage means of its computer equipment unit. The value change notification comprises as parameters, the new value of the indicator (Val(IB1)) and the management information (Management Information (A1)) of the target indicator agent, so that the target indicator agent can assign the value received to the indicator awaited.

According to the invention, the monitored domain constituted by the set of resources (101, 102, 201, 202) is organized into a plurality of subdomains (d1={A1, A2}; d2={B1, B2}). Each of the subdomains contains a set of resources to be monitored.

A subdomain is also characterized by the indicator agents running in the resources constituting the subdomain. For each subdomain, a set of agents called "synthesis agents" is installed in a particular resource so as to constitute a synthesis node. This resource can be a dedicated monitoring resource or a general-purpose resource chosen because of its technical characteristics to support the synthesis node. Moreover, this resource could also be a given resource of the subdomain or of another subdomain. In fact, one resource can support the monitoring of several subdomains, for example ranging from 0 to n, if this resource is capable of handling the load produced by the calculations performed by a plurality of sets of synthesis agents.

Basically, the structure of a synthesis agent is identical to that of an indicator agent; the difference in terms of behavior and utilization lies mainly in the formula representing the indicator to be evaluated.

During the configuration of the monitoring of the monitored domain according to the invention, a naming service is used to define and maintain the associations between the name of the subdomain and the identification of the indicator agent responsible for evaluating an indicator of the subdomain.

In other words, the naming service (SN) supplies, for each subdomain, all of the indicator agents present in this subdomain and associates, for example in a table (4) or in an association file, each indicator agent (A1) with the indicator (Ia1) it calculates and with the subdomain (d1) to which it belongs. This naming service SN is then used during the configuration of each synthesis agent. This naming service can be either centralized or distributed. When the naming service is centralized, as represented in FIG. 1, the information relative to the association between a subdomain and an indicator agent is centralized in a single place in the monitored domain represented, for example, by a resource of the monitored domain.

When the naming service is distributed, the naming service associated with each indicator agent machine has the names of the indicator agents it manages, as well as the subdomain to which each indicator agent belongs.

The indicator agent machine manages a certain number of properties, i.e. the atomic aspect of an indicator agent's reaction to a notification and the delivery of the notifications in a causal sending order.

The indicator agent machine handles the distribution of the notifications, the transmission of the notifications and the management of the overall atomicity. The indicator agent machine comprises various entities such as an execution engine and a communication channel, this channel having two queues, a local queue and an external queue.

The indicator agent machine is distributed. The indicator agent machines communicate with each other; the indicator agents do not see this distribution since they communicate through notifications and address their local indicator agent machine. An indicator agent's reaction is always local.

The centralized or distributed naming service SN is necessary for the configuration of the synthesis agents (As). In essence, as a general rule, a synthesis agent is designed to evaluate an indicator whose formula includes at least one set-oriented operator such as a sum, an average, or the determination of a minimum or a maximum in one or more indicators of the subdomain with which the synthesis agent is associated. However, a synthesis agent can also evaluate an indicator representing the general operation of the subdomain with which it is associated.

Thus, the configuration of a synthesis agent requires the latter to subscribe to all the indicator agents of the subdomain monitored by the synthesis agent that evaluate the indicator or indicators contained in the formula of the indicator of the synthesis agent. To do this, the synthesis agent (As) sends the naming service (SN), for each indicator required for the evaluation of its own indicator, a notification requesting an indicator lookup (indicatorLookupReq) that specifies the name of the subdomain (d1) that the synthesis agent (As) monitors, as well as the names of the indicators required for the evaluation of its own indicator. In response to this notification, the naming service performs a search in order to find the names of all the indicator agents that perform the evaluation of the requested indicator in the subdomain specified in the notification. The naming service constructs and then sends a response notification (indicatorLookupResp) to the requesting synthesis agent containing the name of the domain (d1) and the name of the indicator agent or agents (A1, A2), if they exist. This response notification is processed by the synthesis agent, which extracts the names of the indicator agents and activates, for each indicator agent extracted, the subscription procedure described above.

In a variant of embodiment, when no indicator agent corresponding to the subdomain name/indicator name association exists, the naming service can include means for storing the name of the synthesis agent that sent the notification and the name of the indicator requested. Thus, as soon as a new indicator agent is installed in the subdomain, it is detected by the detection means of the naming service (SN) or is declared to the latter by the installer. The naming service includes means for performing an update of the subdomain name/indicator name associations and for verifying whether the name of the indicator corresponds to a stored indicator name. If so, means in the naming service construct, sends, the response notification (indicatorLookupResp) to the indicator agents whose names have been previously stored that have requested the name of the indicator agent responsible for the new indicator detected.

In another variant, the naming service uses an indicator agent creation tool, such as an indicator agent machine, to construct the indicator agent requested. In other words, the naming service constructs an indicator agent that evaluates the requested indicator in the specified subdomain.

According to the invention, the number of resources per subdomain is lower than a predetermined maximum number. This number is determined as a function of the monitoring policy chosen. For example, the maximum number of resources per subdomain is determined so that the cost of calculating the indicators of the synthesis agents is as low as possible, in order to reduce the calculation load in the resource or resources supporting the synthesis agents. Another possibility consists of determining the maximum number of resources per domain so that the number of synthesis nodes is as low as possible, in order to reduce the number of resources responsible for monitoring and to concentrate the information representing the monitoring.

Figure 2:
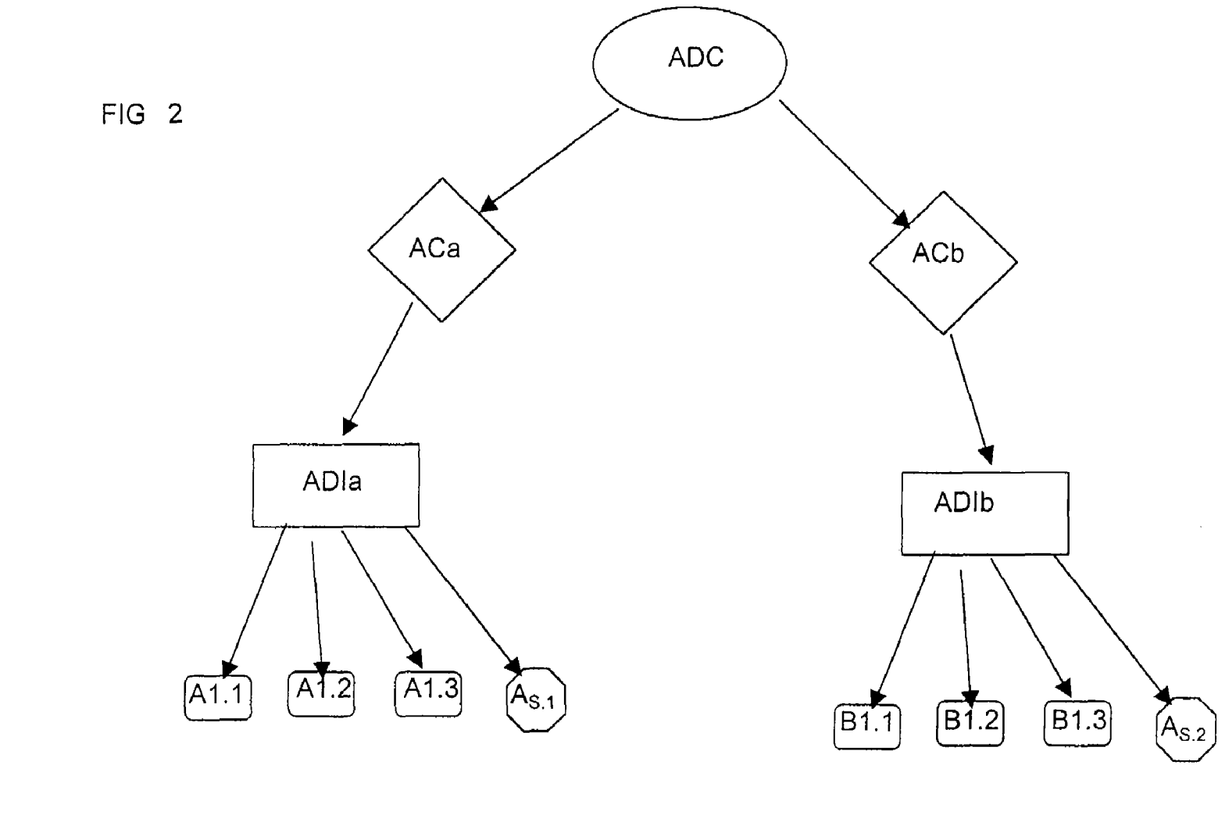
FIG. 2 represents the process for deploying a monitoring method.

According to FIG. 2, the deployment of a monitoring configuration consists of performing the instantiation, i.e. the creation, of the indicator agents for the indicators defined by the list $\{(d1.I1), \ldots, (di.Ij), \ldots, (dn.In)\}$, in which the indicator Ij must be evaluated in the subdomain di. To do this, the deployment method uses an agent called a configuration deployment agent (ADC). This configuration deployment agent handles the creation of agents called configuration agents (AC). Thus, for each resource of a monitored subdomain, the configuration deployment agent (ADC) creates a configuration agent (ACa, ACb), which handles the process of creating the indicator agents (Ai, Bi, Ci) specified by the configuration for the resource that has been assigned to it. Thus, the deployment of the various configurations is parallelized in each of the subdomains to be monitored. In essence, the configuration deployment agents are created for each subdomain to be monitored in parallel fashion.

The configuration deployment agents (ADC) and the configuration agents (AC) have the same characteristics as the indicator agents, i.e. they are also managed by at least one agent machine of at least one resource of the domain to be monitored. The location of the configuration agents is of little importance; the various configuration agents can reside in the same resource or can be deployed in different resources, including even monitored resources.

As explained above, a configuration agent (AC) handles the creation of the indicator agents specified by the configuration for a given resource M belonging to at least one of the subdomains (di) for which this indicator (In) must be created. To this end, for any indicator (In) of the configuration that can be instantiated in the resource M, the configuration agent creates an agent called an indicator deployment agent ($ADI_A$, $ADI_B$, FIG. 2) responsible for the deployment of the indicator or indicators (In) in the resource M.

The indicator deployment agent (ADI) can be created in the same resource as the configuration agent (AC) or in a different resource.

In a variant of embodiment in which the programming language used is the "Java" language, the configuration agents (AC) will induce the dynamic loading of the classes "I_Deployer" and "I_Indicator," using the mechanisms defined by Java runtime. When these classes are not present in the resource in which the configuration process is executed, the configuration agent receives an exception of the "class not found" type "ClassNotFoundException," which activates, at the configuration agent level, means for downloading the software elements it requires in the resource, thereby incrementally deploying the software elements required for the monitoring, from a minimal kernel. Thus, the monitoring method according to the invention provides a solution to the dual problem of configuring a distributed monitoring, i.e., deploying the software configuration and configuring the monitoring.

An indicator deployment agent (ADI) is an agent that determines, for a given type of indicator, the various combinations of the values of the variables for which the indicator will be instantiated. It therefore handles both the name resolution process (described below) and the creation of the indicator agents, as well as their declaration to the naming service (SN).

The names of the objects referenced by the indicator agent that calculates the indicators, as well as the identifications of the agents that calculate the indicators referenced during the calculation, are part of the parameters for the creation of any indicator agent during its instantiation by the indicator deployment agent.

For any indicator (In), an indicator compiler, after analyzing the equation that defines the indicator, generates two object classes "I_Deployer" and "I_Indicator," which respectively correspond to the indicator deployment agents that deploy the instances of the class "I_Indicator" responsible for evaluating the indicator and to the indicator agents that evaluate the indicator. The class "I_Deployer" makes it possible to know which indicator agents identified by the class "I_Indicator" must be created, and makes it possible to declare to the naming service (SN) the indicator agents actually created.

An indicator deployment agent has explicit knowledge of the indicators and the identifiers of the objects referenced by the equation. Each of these object identifiers $Id1, \ldots, Idm$) defines a structure wherein certain elements can be variables.

When the management protocol chosen is the asynchronous protocol SNMP, the indicator deployment agent executes the process (described below) for resolving the names of the objects referenced in the equation or the formula of the indicator and creates the corresponding indicator agents by determining the valid combinations of the values of the variables.

In essence, the equation that defines the calculation of the value of an indicator refers to objects identified by object identifiers $\{Id1, \ldots, Idm\}$ using a possibly empty set of variables $\{V1, \ldots, Vn\}$. Each object identifier Idi is associated with a set of variables $\{W1, \ldots, Wk\}$ belonging to the set $\{V1, \ldots, Vn\}$. Determining the first valid combination of the values of the variables Vi consists of applying a process (described below) for searching through the object identifiers Idi, for example in the order 1 through m, in order to progressively instantiate all the variables $\{V1, \ldots, Vn\}$ and hence to calculate the object identifiers $\{Id1, \ldots, Idm\}$.

When all of the objects identified by $\{Id1, \ldots, Idm\}$ in which the variables have been replaced with their corresponding values belonging to the combination of values $\{V1, \ldots, Vn\}$ exist, the search process of the indicator deployment agent (ADI) verifies whether or not the constraint expressed in the values of the variables is satisfied. The indicator deployment agent (ADI) instantiates the indicator agent only when this last constraint is met. The objects actually referenced by the equation of the indicator are those identified by $\{Id1, \ldots, Idm\}$ in which the variables have been replaced by their corresponding values belonging to the combination of values $\{V1, \ldots, Vn\}$. These objects are passed to the indicator agent as a parameters during the creation of the indicator agent.

In order to find the subsequent valid combinations of the variables Vi, the search process of the indicator deployment agent (ADI) searches for the index k for which there exists a subsequent element for Idk, for k varying between m and 1. If such a value of k does not exist, then the search process is terminated.

If such a value of k does exist, then the search process is applied to the object identifiers Idi, in the order k+1 through m for example, in order to progressively instantiate all the variables $\{V1, \ldots, Vn\}$ and hence to calculate the object identifiers $\{Id1, \ldots, Idm\}$.

The search process therefore makes it possible to calculate all the objects $\{Id1, \ldots, Idn\}$ of the equation that represent an indicator.

The search process comprises a process for binding the variables, defined as follows. The process for binding the variables makes it possible to determine the various variables of the object identifiers Idi. Let Id be an object identifier in which the variables $\{W1, \ldots Wk\}$ belong to the set of values $\{V1, Vn\}$ mentioned above. The identifier Id has the form $a1.W1.a2.W2 \ldots ak.Wk.ak+1$, in which the coefficients ai have the structure of an object name in the ASN.1 sense of the term, which means that the coefficients ai are constituted by a sequence of positive integers.

Let j be the index for which the variables with successive indices $\{W1, \ldots, Wj\}$ are already bound. Finding all of the objects that can be designated by this identifier consists of navigating through the instantiated MIB, searching for the objects by launching a request of the SNMP "GetNextRequest" type, using as a parameter an object identifier whose identifiers begin with the root $R=a1.W1.a2.W2 \ldots aj.Wj$ and by applying an object identifier unifiability criterion, defined below. Let Id' be the response to the SNMP request GetNextRequest applied to the root R, if such an object exists. The object does not exist if the response to the request GetNextRequest indicates that the designated object does not exist, in which case the search is terminated.

If Id and Id' are unifiable according to the criterion defined below, then the variables $\{W1, \ldots, Wk\}$ are all bound, which means that they all have a value, and we have just found the identifier of an object that can be designated by Id, namely Id'.

In order to find the next valid combination of the variables $\{W1, \ldots, Wk\}$, knowing Id', it is necessary to reiterate the preceding process, using Id' as the starting point for the search, after having unbound, i.e., retrieved the previous values of, the variables Wi that were not bound at the very beginning of the preceding search process.

If Id and Id' are not unifiable and the identifier Id' begins with R, then the search continues as before, using Id' as the starting point and unbinding any variable Wi that was not bound at the very beginning of the preceding search process.

If Id' does not begin with R, then there is no longer any existing object whose identifier could be unified with Id. The search process is then terminated.

The unifiability criterion is defined as follows. Let Id' be a reference identifier (without a variable part) wherein all the elements are integer values; two identifiers Id and Id' are unifiable if both identifiers are the same size and if the identifiers Id.ai=Id'.ai for any i belonging to [1, k+1]. Let $\{w1, \ldots, wk\}$ be the integer values of the identifier Id' that correspond to the variables $\{W1, \ldots, Wk\}$ of Id, i.e. that are located at the same position in the corresponding identifier. The binding of the variables Wi takes place sequentially for indices varying between 1 and k through the following method:

if Wi is bound, i.e., if Wi already has a value, then this value must be equal to wi; if the latter condition is not satisfied, then Id and Id' are not unifiable and the binding of the variables $\{W1, \ldots Wk\}$ is not possible;

if Wi is free, i.e., if Wi does not yet have a value, then the variable Wi will be bound to the value wi.

For example, let $Id=1.2.3.W1.4.5.W2.6.7$ and $Id'=1.2.3.10.4.5.20.6.7$. These two object identifiers are unifiable for variables of W1 and W2 whose values are 10 and 20. On the other hand, if Id=1.2.3.W1.4.5.W1.6.7 and Id'=1.2.3.10.4.5.20.6.7, then Id and Id' are not unifiable because the variable W1 cannot have the values 10 and 20 at the same time.

The identifier unification process makes it possible both to verify that two identifiers are unifiable and to determine for which values of the variables that are still free prior to the start of the unification process this unification is possible.

When the name resolution process has exhausted all the valid combinations, the indicator deployment agent (ADI) becomes unnecessary if the monitored configuration is never changed.

When the software and/or hardware configuration of the monitored machine can change, for example, according to the invention, when the predetermined maximum number of machines per subdomain has been reached, the indicator deployment agents are reactivated in order to re-evaluate the hardware and software configuration by performing a search for the instantiable elements, instantiating only those of the indicator agents that don't already exist, and deleting those that no longer have any reason to exist.

In a variant of embodiment, when the programming language is Java, the creation of a configuration agent, an indicator deployment agent or an indicator agent consists of sending an agent creation request "agentCreateRequest" to the "factory" agent of the agent machine that manages the subdomain in which the agent must be deployed. This request includes as parameters the identification of the agent and the status of the agent. The status of the agent corresponds to the serialized Java object of this agent. When the "factory" agent receives this request, it deserializes the serialized Java object and thereby obtains the requested agent.

It should be clear to those skilled in the art that the present invention allows for embodiments in many other specific forms without going beyond the scope of application of the invention as claimed. Consequently, the present embodiments should be considered as examples, but can be modified within the range defined by the true merit of the invention and scope of the attached claims, and the invention should not be limited to the details given above.

The invention claimed is:

1. A deployment device comprising:
a computer configured to deploy, a distributed monitoring of a computer system having a plurality of resources to be monitored by said deployment device, wherein said resources form a monitored domain, said deployment device including a computer readable storage medium upon which is encoded a sequence of instructions, which when executed by the computer, cause the deployment device to establish distributed monitoring of the computer system;
a plurality of indicator agents stored on a computer readable storage medium each configured to evaluate an indicator comprising a value characterizing a status or an operation of one or more resources of the computer system and an indicator-defining function for determining said value by searching through object identifiers, instantiating associated variables using a network management protocol, and unifying the object identifiers using a unifiability criteria;
a configuration module encoded with a sequence of instructions to specify one or more domains of the computer system in which each said indicator agent is to be deployed, the configuration module comprising a configuration deployment agent that creates a configuration agent for creating the plurality of indicator agents for the resource, and each indicator agent evaluates one of the plurality of indicators and manages an associated subscriber list; and
writing modules associated with each indicator agent, and encoded with a sequence of instructions to write in the associated subscriber list, upon receiving a subscription notification from at least one other indicator agent, an identification and management information of said at least one other indicator agent, and the subscriber list being managed by the associated indicator agent and stored using storage means of the resource associated with the indicator agent.

2. A deployment device according to claim 1, wherein each configuration agent comprises means which creates an indicator agent for each indicator of the resource to which said indicator is assigned, said indicator agent being an indicator deployment agent which determines, for the indicator with which said deployment agent is associated, various combinations of the values of the variables used by the function from which said indicator is determined.

3. A deployment device according to claim 2, further comprising an indicator compiler that generates, for each indicator, after analyzing the function from which said indicator is determined, at least two different object classes comprising:
a first object class "I_Deployer" associated with the indicator deployment agents that deploys instances of a second object class "I_Indicator"; and
the second object class "I_Indicator" associated with the indicator agents that evaluates the indicator, said second object class "I_Indicator" being configured to identify indicator agents;
wherein the first class object "I_Deployer" is configured to specify which indicator agents identified by the second object class "I_Indicator" must be created and to declare to a naming service the indicator agents actually created.

4. A deployment device according to claim 1, wherein the indicator agent comprises name resolution means which resolves names of objects referenced in the function from which the indicator is determined; and
means which creates corresponding indicator agents by determining valid combinations of the values of the variables of said objects determined by the name resolution means.

5. A deployment device according to claim 2, wherein the indicator deployment agent comprises name resolution means which resolves names of objects referenced in the function from which the indicator is determined; and
means which creates corresponding indicator agents by determining valid combinations of the values of the variables of said objects determined by the name resolution means.

6. A deployment device according to claim 4, wherein the name resolution means comprises search means which searches for all objects identified in the function from which the indicator is determined, the search means comprising:
means which verifies, for a referenced object, whether a constraint expressed in the values of the variables is satisfied; and
means which creates the indicator agent associated with the indicator deployment agent if the constraint is satisfied, using as parameters the objects corresponding to the valid combinations of the values of the variables found.

7. A deployment device according to claim 2, wherein the configuration deployment agents and the configuration agents are managed by at least one agent machine installed in at least one resource of the monitored domain, the at least one agent machine being configured to handle the distribution of one or more subscription notifications and the transmission of the subscription notifications and the management of overall indicator agent atomicity.

8. A deployment device according to claim 3, wherein the configuration deployment agents and the configuration agents are managed by at least one agent machine installed in at least one resource of the monitored domain, the at least one agent machine being configured to handle the distribution of one or more subscription notifications and the transmission of the subscription notifications and the management of overall indicator agent atomicity.

9. A deployment device according to claim 2, further comprising means which manages each indicator deployment agent either by the agent machine that manages the configuration agent associated with the indicator deployment agent, or by a different agent machine, the at least one agent machine being configured to handle the distribution of one or more subscription notifications and the transmission of the subscription notifications and the management of overall indicator agent atomicity.

10. A deployment device according to claim 3, further comprising means which manages each indicator deployment agent either by the agent machine that manages the configuration agent associated with the indicator deployment agent, or by a different agent machine, the at least one agent machine being configured to handle the distribution of one or more subscription notifications and the transmission of the subscription notifications and the management of overall indicator agent atomicity.

11. A method for deploying a distributed monitoring of a computer system having a plurality of resources to be monitored by a deployment device included in the computer system, the deployment device including a computer readable storage medium upon which is encoded a sequence of instructions, which when executed by the computer, causes the deployment device to establish distributed monitoring of the computer system, the method comprising:
    evaluating, using a plurality of indicator agents stored on a computer readable storage medium, an indicator comprising a value characterizing a status or an operation of one or more resources of the computer system and an indicator-defining function for determining said value by searching through object identifiers, instantiating associated variables using a network management protocol, and unifying the object identifiers using a unifiability criteria;
    specifying, using a configuration module encoded with a sequence of instructions, one or more domains of the computer system in which each said indicator agent is to be deployed, the configuration module comprising a configuration deployment agent that creates a configuration agent for creating the plurality of indicator agents for the resource, wherein each indicator agent evaluates one of the plurality of indicators and manages an associated subscriber list; and
    writing, using a writing module associated with each indicator agent and encoded with a sequence of instructions, in the associated subscriber list, upon receiving a subscription notification from at least one other indicator agent, an identification and management information of said at least one other indicator agent, wherein the subscriber list is being managed by the associated indicator agent and stored using storage means of the resource associated with the indicator agent.

12. The method according to claim 11, further comprising creating an indicator agent for each indicator of the resource to which said indicator is assigned, said indicator agent being an indicator deployment agent, and determining, using said indicator deployment agent, for the indicator with which said deployment agent is associated, various combinations of the values of the variables used in the function from which said indicator is determined.

13. The method according to claim 12, further comprising generating, for each indicator, after analyzing the function from which said indicator is determined, at least two different object classes comprising:
    a first object class "I_Deployer" associated with the indicator deployment agents that deploys instances of a second object class "I_Indicator"; and
    the second object class "I_Indicator" associated with the indicator agents that evaluates the indicator, said second object class "I_Indicator" being configured to identify indicator agents;
    wherein the first class object "I_Deployer" is configured to specify which indicator agents identified by the second object class "I_Indicator" must be created and to declare to a naming service the indicator agents actually created.

14. The method according to claim 11, further comprising resolving, using name resolution means, names of objects referenced in the function from which the indicator is determined, and creating corresponding indicator agents by determining valid combinations of the values of the variables of said objects determined by the name resolution means.

15. The method according to claim 12, further comprising resolving, using name resolution means, names of objects referenced in the function from which the indicator is determined, and creating corresponding indicator agents by determining valid combinations of the values of the variables of said objects determined by the name resolution means.

16. The method according to claim 14, further comprising:
    searching for all objects identified in the function from which the indicator is determined;
    verifying, for a referenced object, whether a constraint expressed in the values of the variables is satisfied; and
    creating the indicator agent associated with the indicator deployment agent if the constraint is satisfied, using as parameters the objects corresponding to the valid combinations of the values of the variables found.

17. The method according to claim 12, further comprising managing the configuration deployment agents and the configuration agents by at least one agent machine installed in at least one resource of the monitored domain, the at least one agent machine being configured to handle the distribution of one or more subscription notifications and the transmission of the subscription notifications and the management of overall indicator agent atomicity.

18. The method according to claim 13, further comprising managing the configuration deployment agents and the configuration agents by at least one agent machine installed in at least one resource of the monitored domain, the at least one agent machine being configured to handle the distribution of one or more subscription notifications and the transmission of the subscription notifications and the management of overall indicator agent atomicity.

19. The method according to claim 12, further comprising managing each indicator deployment agent either by the agent machine that manages the configuration agent associated with the indicator deployment agent, or by at least one different agent machine, the at least one agent machine being configured to handle the distribution of one or more subscription notifications and the transmission of the subscription notifications and the management of overall indicator agent atomicity.

20. The method according to claim 12, further comprising managing each indicator deployment agent either by the agent machine that manages the configuration agent associated with the indicator deployment agent, or by at least one different agent machine, the at least one agent machine being configured to handle the distribution of one or more subscription notifications and the transmission of the subscription notifications and the management of overall indicator agent atomicity.

* * * * *